(12) United States Patent
Baldemair

(10) Patent No.: US 11,569,964 B2
(45) Date of Patent: Jan. 31, 2023

(54) ACKNOWLEDGEMENT SIGNALING PROCESSES FOR RADIO ACCESS NETWORKS

(71) Applicant: Telefonaktiebolaget LM Ericsson (publ), Stockholm (SE)

(72) Inventor: Robert Baldemair, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/652,513

(22) PCT Filed: Oct. 13, 2017

(86) PCT No.: PCT/SE2017/051013
§ 371 (c)(1),
(2) Date: Mar. 31, 2020

(87) PCT Pub. No.: WO2019/074414
PCT Pub. Date: Apr. 18, 2019

(65) Prior Publication Data
US 2020/0287691 A1 Sep. 10, 2020

(51) Int. Cl.
*H04L 5/00* (2006.01)
*H04L 1/18* (2006.01)

(52) U.S. Cl.
CPC .............. *H04L 5/0055* (2013.01); *H04L 1/18* (2013.01)

(58) Field of Classification Search
CPC ....... H04L 1/18; H04L 1/1854; H04L 1/1861; H04L 5/0055
See application file for complete search history.

(56) References Cited

U.S. PATENT DOCUMENTS

2010/0174962 A1* 7/2010 Zheng ................... H04L 1/1607
714/E11.131
2016/0036578 A1 2/2016 Malladi et al.
(Continued)

OTHER PUBLICATIONS

International Search Report and Written Opinion dated Jul. 5, 2018 for International Application No. PCT/SE2017/051013 filed Oct. 13, 2017, consisting of 10-pages.
(Continued)

*Primary Examiner* — Mansour Oveissi
(74) *Attorney, Agent, or Firm* — Christopher & Weisberg, P.A.

(57) ABSTRACT

Methods and devices for operating a feedback radio node in a radio access network. The feedback radio node is configured with a feedback configuration, the feedback configuration configuring the feedback radio node to provide acknowledgement feedback pertaining to a subject transmission scheduled for reception by the feedback radio node. The feedback configuration configures, for the acknowledgement feedback, a plurality of data substructures associated to the subject transmission such that the acknowledgement feedback comprises at least one bit of acknowledgment information for each of the data substructures. The feedback radio node is configured with a transmission configuration, the transmission configuration configuring transmission resources for transmission by the feedback radio node. An acknowledgment feedback pertaining to the subject transmission is transmitted such that at least one bit of acknowledgment information pertains to a data structure having at least two data substructures associated to the subject transmission.

20 Claims, 2 Drawing Sheets

(56) References Cited

U.S. PATENT DOCUMENTS

2017/0207895 A1 7/2017 Yang et al.
2017/0347279 A1* 11/2017 Bejerano ........... H04W 28/0268

OTHER PUBLICATIONS

3GPP TSG-RAN WG1NR R1-1702732; Title: eMBB Encoding Chain; Agenda Item: 8.1.4; Source: Mediatek, Inc.; Document for: Discussion/Decision; Location and Date: Athens, Greece, Feb. 13-17, 2017, consisting of 9-pages.
3GPP TSG RAN WG1 Meeting #88 R1-1702665; Title: Enhanced HARQ feedback for downlink transmission; Agenda Item: 8.1.3.3.1; Source: Lenovo, Motorola Mobility; Document for: Discussion; Location and Date: Athens, Greece, Feb. 13-17, 2017, consisting of 3-pages.
European Communication dated Nov. 8, 2021 for Application No. 17787669.5, consisting of 6 pages.

* cited by examiner

ACKNOWLEDGEMENT SIGNALING PROCESSES FOR RADIO ACCESS NETWORKS

CROSS-REFERENCE TO RELATED APPLICATIONS

This application is a Submission Under 35 U.S.C. § 371 for U.S. National Stage Patent Application of International Application Number: PCT/SE2017/051013, filed Oct. 13, 2017 entitled "ACKNOWLEDGEMENT SIGNALING PROCESSES FOR RADIO ACCESS NETWORKS," the entirety of which is incorporated herein by reference.

TECHNICAL FIELD

This disclosure pertains to wireless or telecommunication communication technology, in particular to radio access technology, e.g. for mobile communication.

BACKGROUND

Currently, radio telecommunication technology of $5^{th}$ Generation is being developed, with the goal to serve a large variety of use cases. Accordingly, the related systems have to be very flexible. Such flexibility, however, can introduce undesirable signaling overhead.

One field that is of particular importance for many applications is related to acknowledgement signaling processes, which determine whether transmitted data has been received correctly, or should be retransmitted. Examples of such processes include HARQ and ARQ processes.

SUMMARY

It is an object of this disclosure to present approaches allowing efficient (e.g., incurring low signaling overhead) and flexible acknowledgement signaling. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. It should be noted that in the following, the terms data (sub)structure and data block (sub)structure may be considered to be used synonymously.

There is generally disclosed a method of operating a feedback radio node in a radio access network. The feedback radio node is being configured with a feedback configuration, the feedback configuration configuring the feedback radio node to provide acknowledgement feedback pertaining to a subject transmission scheduled for reception by the feedback radio node. The feedback configuration configures, for the acknowledgement feedback, a plurality of data substructures associated to the subject transmission such that the acknowledgement feedback comprises at least one bit of acknowledgment information for each of the data substructures. The feedback radio node is further being configured with a transmission configuration, the transmission configuration configuring transmission resources for transmission by the feedback radio node. The method comprises transmitting, on the transmission resources, acknowledgment feedback pertaining to the subject transmission such that at least one bit of acknowledgment information pertains to a data structure comprising at least two data substructures associated to the subject transmission.

Moreover, a feedback radio node for a radio access network is considered. The feedback radio node is adapted for being configured with a feedback configuration, the feedback configuration configuring the feedback radio node to provide acknowledgement feedback for a subject transmission scheduled for reception by the feedback radio node, wherein the feedback configuration configures, for the acknowledgement feedback, a plurality of data substructures associated to the subject transmission such that the acknowledgement feedback comprises at least one bit of acknowledgment information for each of the data substructures. The feedback radio node further is adapted for being configured with a transmission configuration, the transmission configuration configuring transmission resources for transmission by the feedback radio node. The feedback radio node is adapted for transmitting, on the transmission resources, acknowledgment feedback pertaining to the subject transmission such that at least one bit of acknowledgment information pertains to a data structure comprising at least two data substructures of the subject transmission. The feedback radio node may comprise, and/or be adapted for utilising, processing circuitry and/or radio circuitry, in particular a transmitter and/or transceiver and/or receiver, for transmitting the acknowledgment feedback and/or signaling on the transmission resources, and/or for receiving the configuration/s and/or the subject transmission, respectively. Alternatively, or additionally, the feedback radio node may comprise a transmitting module and/or a receiving module for such transmitting and/or receiving.

A feedback radio node may in particular be a user equipment. However, in some implementations like backhaul or relay scenarios, it may be implemented as network node, e.g. a node downlink of a base station, e.g. a relay node or transmission point.

A method of operating a configuring radio node in a radio access network may be considered. The method comprises configuring a feedback radio node with a feedback configuration, the feedback configuration configuring the feedback radio node to provide acknowledgement feedback for a subject transmission scheduled for reception by the feedback radio node, wherein the feedback configuration configures, for the acknowledgement feedback, a plurality of data substructures associated to the subject transmission such that the acknowledgement feedback comprises at least one bit of acknowledgement information for each of the data substructures. The method also comprises configuring the feedback radio node with a transmission configuration, the transmission configuration configuring transmission resources for transmission by the feedback radio node. Moreover, the method comprises receiving acknowledgment feedback transmitted on the transmission resources, the acknowledgement feedback pertaining to the subject transmission such that at least one bit of acknowledgment information of the acknowledgement feedback pertains to a data structure comprising at least two data substructures associated to the subject transmission.

In addition, a configuring radio node for a radio access network is described. The configuring radio node is adapted for configuring a feedback radio node with a feedback configuration, the feedback configuration configuring the feedback radio node to provide acknowledgement feedback for a subject transmission scheduled for reception by the feedback radio node, wherein the feedback configuration configures, for the acknowledgement feedback, a plurality of data substructures associated to the subject transmission such that the acknowledgement feedback comprises at least one bit of acknowledgment information for each of the data substructures. The configuring radio node further is adapted for configuring the feedback radio node with a transmission configuration, the transmission configuration configuring transmission resources for transmission by the feedback radio node. The configuring radio node also is configured for receiving acknowledgment feedback transmitted on the transmission resources, the acknowledgement feedback pertaining to the subject transmission such that at least one bit of acknowledgment information of the acknowledgement feedback pertains to a data structure comprising at least two data substructures associated to the subject transmission. The configuring radio node may comprise, and/or be adapted for utilising, processing circuitry and/or radio circuitry, in particular a transmitter and/or transceiver and/or receiver, for configuring, and/or for receiving acknowledgement feedback, respectively. Alternatively, or additionally, the configuring radio node may comprise a corresponding configuring module and/or a receiving module. It may be considered that the functionality of the configuring radio node is distributed over several physical or logical devices. For example, configuring may be performed by a different device than receiving. In this case, instead of a configuring radio node, a configuring arrangement or node arrangement may be considered. The devices/nodes of such an arrangement may be communicatively connected, e.g. via suitable communication interfaces.

Receiving acknowledgement feedback may comprise mapping and/or interpreting the feedback accordingly.

A configuration radio node may be implemented as a network node, e.g. a base station. However, in some cases, e.g. for sidelink communication, it may be implemented as user equipment.

A system comprising the configuration radio node/node arrangement, and one or more feedback radio nodes may be considered.

The transmission configuration may pertain to transmitting on a shared channel, in particular a physical shared channel. However, in some cases, the channel may be dedicated. It may be considered that the channel is a data channel and/or an URLLC channel, however, in some cases, it may be a control channel. The channel may generally be a physical channel. It may be considered that the transmission configuration pertains to PUSCH or PSSCH. In general, the transmission configuration may pertain to one or more channels, and/or one or more carriers and/or MIMO layers, e.g. in a carrier aggregation. The channel may in some versions be an uplink or sidelink channel.

It may be considered that the feedback configuration pertains to transmitting on a control channel, in particular a physical control channel. The channel way be an uplink or sidelink channel, for example PUCCH or PSSCH or similar. In general, the feedback configuration may pertain to one or more channels, and/or one or more carriers and/or MIMO layers, e.g. in a carrier aggregation. The channel may in some versions be an uplink or sidelink channel.

The acknowledgement information configured by the feedback configuration has a size of N bits, wherein the acknowledgement information transmitted on the transmission resources has a size of M bits, wherein N may be larger than M. M may in particular be limited to 2 or smaller, e.g. for puncturing. This may include transmitting the acknowledgment information instead of the acknowledgement information configured by the feedback configuration. If M is smaller than N, mapping the acknowledgement information to the data structure may be considered to be bundling. However, some cases with N smaller than M, or N equal to M may be considered, for example for preemption cases, in which a higher or different resolution of acknowledgement information may be utilised, and/or if additional acknowledgement about the data structure is added to the acknowledgment feedback.

The feedback configuration may configure acknowledgement information for a data structure of subject transmission, e.g. a transport block or multiple transport blocks, e.g. in a MIMO scenario. Other data structures of other scheduled transmission may be handled differently in the context of acknowledgement feedback. It may be considered that a feedback configuration is a code block group configuration, which indicates acknowledgement information to be provided for code block groups.

Acknowledgement information pertaining to subject transmission may generally be information allowing (at least) indication of ACK/NACK for the subject transmission, for example a data structure and/or one or more substructures thereof.

Transmitting the acknowledgement information/feedback pertaining to the subject transmission may generally be based on timing and/or size of the acknowledgement information and/or operational conditions and/or transmission format and/or number of subject transmission for which acknowledgement feedback is to be transmitted (which may be indicated by the total number of bits required).

Generally, a plurality of different feedback configurations may be configured, each of which may pertain to different subject transmission and/or different HARQ processes.

Acknowledgement feedback may be transmitted on the transmission resources for one or more of these configurations and/or associated subject transmissions. However, mapping of acknowledgement information to the resources may be different for different subject transmission and/or feedback configurations, e.g. based on timing and/or configured feedback size (in number of bits) and/or transmission format configured by the feedback configuration.

Timing may in particular be based on timing of reception of the feedback configuration, and/or timing of reception of the transmission configuration, and/or timing of the transmission resources, and/or timing of the scheduled subject transmission. Timing of the transmission resources (or in some cases, the resource/s for the configurations or subject transmission) may in particular pertain to slot and/or start and/or end and/or duration of the resources in time domain. In particular for long transmissions (e.g., long PUSCH or multi-slot transmissions), the end and/or duration may be particular important. The timing may be a relative timing between two of the above timing events.

Subject transmission may be considered late if the feedback configuration pertaining to it is received after (or in the same slot) the transmission configuration, and/or the subject transmission is scheduled for reception after (or in the same slot as) reception of the transmission configuration. Late subject transmission may be bundled, e.g. such that M is smaller than N.

Acknowledgement information having a size above a threshold, e.g. before or after bundling, may be rate-matched onto the transmission resources, or transmitted on other resources, e.g. resources scheduled with the feedback configuration, and/or on another channel, e.g. a PUCCH or other control channel. Acknowledgement information having size equal to or below the threshold size may be transmitted on the transmission resources as disclosed, and/or punctured thereon.

Transmission resources may generally comprise a range or pool of resources, which may be available for transmission, in particular for PUSCH or PSSCH. The acknowledgement information may be mapped to, and/or transmitted on the earliest time resources of the transmission resources, e.g. the first symbol/s thereof.

In some variants, the data structure may be a transport block, and the data substructures may be code block groups, which may have the same or different sizes, e.g. in terms on bit size and/or number of code blocks contained.

The subject transmission may be a MIMO-transmission utilising at least two MIMO-layers and/or data streams. In this case, it may be considered that the data substructures are transport blocks, and the data structure a combination of transport blocks.

A data substructure, e.g. a code block group, may generally comprises one or more code blocks.

In some cases, the bits of the acknowledgement information are punctured onto transmission resources. This allows quick feedback in particular for late subject transmissions.

The subject transmission may be a transmission on a data channel, in particular a physical data channel, like a PDSCH or PSSCH or a URLLC channel.

It may be considered that the feedback configuration is configured utilising control signaling, in particular a scheduling assignment, and/or that the transmission configuration is configured utilising control signaling, in particular a scheduling grant. The feedback configuration may be configured after the transmission configuration.

There is also described a program product comprising instructions adapted for causing processing circuitry to control and/or perform a method as described herein.

A carrier medium arrangement carrying and/or storing a program product as described herein is also envisioned.

A subject transmission may generally be any transmission or signaling subject to an acknowledgement signaling process, e.g. data signaling, or in some cases control signaling. The transmission may pertain to a specific acknowledgement process, e.g. according to a HARQ or ARQ process identifier, or in some cases to more than one process, e.g. for MIMO scenarios, and/or for subprocesses. Subject transmission in some variants may be in the downlink or sidelink.

Acknowledgement feedback may be considered as a form of acknowledgment signaling, and the terms may be used exchangeably. Acknowledgement feedback or signaling configured based on the feedback configuration may be uplink signaling, data signaling to which the acknowledgement signaling pertains may be downlink signaling. However, variants in which both may be sidelink signaling (with different communication directions) are envisioned. Acknowledgement feedback may in particular be HARQ feedback.

A feedback configuration may configure and/or indicate feedback resources for transmitting the feedback, and/or reception resources for receiving the subject transmission, and/or a channel on which to transmit the feedback, e.g. a PUCCH or PSCCH. The feedback configuration may indicate a code block group configuration. It may be considered that the feedback configuration configures a transmission format.

A transmission configuration may configure transmission resources for uplink or sidelink transmission (e.g., in opposite communication direction to sidelink signaling configuring the transmission configuration). Resources, in particular transmission resources, may pertain to a specific channel, and/or may comprise time and/or frequency and/or code resources.

Acknowledgement signaling may generally represent and/or comprise and/or contain acknowledgement information, which may be structured based on the feedback configuration.

Acknowledgement information may represent and/or comprise one or more bits, in particular a pattern of bits. Multiple bits pertaining to a data substructure may be considered a subpattern. The structure of acknowledgement information may indicate the order, and/or meaning, and/or mapping, and/or pattern of bits (or subpatterns of bits) of the information. An acknowledgment configuration, in particular the feedback configuration, may indicate the size of, and/or arrangement and/or mapping of bits of, acknowledgement information carried by the acknowledgement signaling the configuration pertains to. The structure or mapping may in particular indicate one or more data block structures, e.g. code blocks and/or code block groups and/or transport blocks the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgement configuration, in particular the feedback configuration, may generally indicate the number of bits of acknowledgement information represented by the acknowledgement signaling, and/or the size of the acknowledgement information, wherein the size might be represented by a number of bits and/or number of modulation symbols.

It may be considered that an acknowledgement configuration, in particular the feedback configuration, may indicate a mapping of one or more acknowledgment bit subpattern/s to one or more data block structures to which the acknowledgement bit subpatterns pertain, e.g. to one or more code block groups or one or more transport blocks, or a combination thereof. An acknowledgement bit pattern may represent acknowledgement information, an acknowledgement bit subpattern may represent a subpattern of the pattern.

A transmission format may generally indicate one or more data block structures or substructures for transmission or reception, and/or how a data block like a transport block (and/or a related structure) is divided, e.g. into subblocks or subblock groups, like code block/s and/or code block group/s. A transmission format may in some cases pertain to more than one data block, and/or may pertain to more than one acknowledgement signaling process. It may be considered that a transmission format indicates size in bits and/or coding for the one or more data block structures or substructures. A transmission format may pertain to signaling to be transmitted by a radio node, or to signaling to be received, and/or to acknowledgement signaling pertaining to signaling to be received. For different communication directions, and/or different carriers and/or bandwidth parts, and/or sets thereof, and/or different configurations, in particular different configurations of the set of acknowledgement configurations, different transmissions formats may be utilised, e.g. defined and/or configured. In particular, a transmission format for transmission on the transmission resources may be different from a transmission format associated to an acknowledgement configuration like the feedback configuration. Transmission formats may be independently configured from each other, e.g. using different messages and/or different signaling, e.g. on different layers of the protocol stack.

An acknowledgement configuration like the feedback configuration may generally be a code block group configuration, which may indicate a mapping of one or more acknowledgement information subpatterns (e.g., one or more bits) to one or more code block groups, each of which may comprise or consist of the same or a different number of code blocks, in particular one or more code blocks. Each subpattern may be mapped to one code block group. In some variants, an acknowledgement configuration may indicate a mapping of one or more subpatterns to one or more transport blocks, each of which may comprise and/or consist of one or more code block groups. Each subpattern may be mapped to one transport block. An acknowledgement configuration may pertain to a combination of code block group/s and transport block/s, in particular regarding the structure or transmission format of corresponding acknowledgement information. An acknowledgement configuration may be considered to configure and/or format feedback or acknowledgement information pertaining to code block groups or transport blocks or code blocks.

A data block structure may correspond to a scheduled data block, e.g. for data signaling. The data blocks may be associated to separately scheduled transmissions, e.g. separate channels and/or instances and/or carriers and/or component carriers and/or data streams, e.g. in the context of carrier aggregation and/or multiple-antenna transmissions, e.g. MIMO (Multiple-Input, Multiple-Output). The data blocks and/or associated data signaling may be for downlink, or in some cases for sidelink. The acknowledgement signaling may generally be uplink signaling, but in some variants may be sidelink signaling. However, there may be considered cases in which data signaling is uplink signaling, e.g. in the context of retransmission performed by a user equipment. A subpattern may represent the acknowledgement information and/or feedback for the associated data block, e.g. with the size as indicated by an assignment indication. Different data blocks may be associated to different transmission instances and/or different acknowledgment signaling processes, e.g. HARQ processes. An acknowledgement signaling procedure may comprise one or more acknowledgement signaling processes, which may pertain to the same communication direction.

A data block structure may generally represent, and/or be associated to, a scheduled data block and/or corresponding signaling. The data block may be scheduled for reception, e.g. by control signaling, in particular a control information message, which may be a scheduling assignment. In some cases, a scheduled data block may not be received, which may be reflected in the corresponding acknowledgement signaling. A number of data block structures, and/or the number of assignment indications, may be considered to represent a number of transmissions of data scheduled to be received by the user equipment (or second radio node).

A data block structure may generally represent, and/or correspond to, a data block, which may generally be a block of data and/or bits. A data block may for example be a transport block, code block, or code block group. It may be considered that a data block structure represents a data block which may be intended to be subjected to an acknowledgement signaling process. A data block may comprise one or more subblocks, which may be grouped into one or more subblock groups, e.g. code block groups. A data block may in particular be a transport block, which may comprise one or more code blocks and/or one or more code block groups. A data block structure may be considered to accordingly represent a transport block, code block or code block group. A subblock group like a code block group may comprise one or more subblocks, e.g. code blocks. It may be considered that a data block comprises one or more subblock groups, which may have the same or different sizes (e.g., in number of bits, e.g. systemic and/or coding bits). It may be considered that a data block comprises information bits or systematic bits (which may be considered to represent data to be transmitted and/or error detection bits) and/or coding bits, e.g. bits for error coding like error detection and/or in particular error correction coding, and/or parity or CRC (Cyclic Redundancy Check) bits. A subblock (e.g., code block) and/or subblock group (e.g., code block group) may analogously comprise systemic and/or coding bits. In some cases, systematic bits may be considered to comprise information and error detection bits determined based on the information bits. Parity bits may be considered to represent error correction coding bits. It should be noted that for a data structure (like a transport block) comprising one or more substructures (e.g., CBGs or code blocks), the systematic bits, and possibly parity bits, of the substructures may be considered information bits, based on which error detection coding and/or correction coding may be performed.

An acknowledgment signaling process may be a HARQ process, and/or be identified by a process identifier, e.g. a HARQ process identifier or subidentifier. Acknowledgement signaling and/or associated acknowledgement information may be referred to as feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock. Generally, to an acknowledgment signaling process there may be associated one specific subpattern and/or a data block structure, for which acknowledgment information may be provided.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, e.g. LDPC or polar coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to as feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

Generally, the acknowledgement signaling may be signaling at one instance and/or in one transmission timing structure, and/or scheduled for common transmission and/or the acknowledgement information may be jointly encoded and/or modulated. The acknowledgement information may pertain to a plurality of different transmissions, associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

A radio node, in particular a configuring radio node, may generally be adapted for scheduling data blocks or subject transmission for transmission and/or to provide and/or determine and/or configure associated assignment indications, which may include a total assignment indication. Configuring a second radio node or an UE may comprise such scheduling and/or associated determining and/or configuring and/or providing of the assignment indications.

A resource structure may represent time and/or frequency and/or code resources. In particular, a resource structure may comprise a plurality of resource elements, and/or one or more resource blocks/PRBs. To a resource structure, there may be associated a type of signaling, in particular control signaling, and/or a signaling format, and/or a latency requirement. A latency requirement may in particular define when, after receiving signaling, the response has to be transmitted, e.g. with delay that may allow for processing. The requirement may define a delay of 1 symbol or 2 symbols between the end of the received signaling and the transmission of response control signaling, in particular acknowledgement signaling pertaining to the received signaling, e.g. data signaling. A resource structure may correspond to resources in the transmission resource pool. Different resource structures may differ in at least one resource element. Resource structures may be arranged and/or grouped in the transmission resource pool, e.g. according to a configuration, which may be a higher layer configuration, e.g. based on MAC or RRC signaling. Short response control signaling may generally be associated to a short format, e.g. short PUCCH or short PSCCH, e.g. according to NR standardisation, if applicable. Long response control signaling may generally be associated to a long format, e.g. long PUCCH or long PSCCH.

Signaling may be considered to carry a message and/or information, if the message and/or information is represented in the (modulated) waveform of the signaling. In particular, extraction of a message and/or information may require demodulation and/or decoding of the signaling. Information may be considered to be included in a message if the message comprises a value and/or parameter and/or bit field and/or indication or indicator representing the information, or more than one or a combination thereof. Information included in such a message may be considered to be carried by the signaling carrying the message, and vice versa. A signaling characteristic, however, may pertain to a characteristic accessible without demodulation and/or decoding, and/or may be determined or determinable independent thereof. However, in some cases it may be considered that signaling is demodulated and/or decoded to determine whether the characteristic is associated to specific signaling, e.g. if the resources characterising the signaling actually belong to control signaling and/or to signaling intended for the responding radio node or user equipment. Also, in some cases, the characteristic may be provided as information in a message, in particular if the characterising signaling is not carrying the selection control message. Generally, selection of the resource structure may be based on one or more than one signaling characteristics. A signaling characteristic may in particular represent one or more resources, in particular in time domain, e.g. beginning and/or end and/or duration of the signaling, e.g., represented in symbol/s, and/or frequency range or resources of the signaling, e.g. represented in subcarrier/s, and/or numerology of the signaling, in particular of control signaling or data signaling like PDSCH signaling or PSSCH signaling. In some cases, the characteristic may indicate a message format, e.g. a format of the selection control message, for example an associated DCI or SCI format. It may generally be considered that a signaling characteristic represents and/or indicates a DCI format and/or search space (e.g., reception pool) and/or code, e.g. scrambling code, and/or an identity, e.g. one of different identities (like R-NTI or C-NTIs) assigned to the responding radio node or user equipment. Control signaling may be scrambled based on such identity.

The approaches described herein allow flexible acknowledgement signaling without unduly increase of overhead. In particular, the selection of a feedback configuration out of a set lowers the overhead for low level control signaling, e.g. signaling carrying DCI or SCI. The approaches are in particular suitable to easily adapt to demands on latency and/or transmission correctness depending on use cases, which may be defined by, and/or be dependent on, requirements of an information system connected to the RAN. In particular, the approaches allow adaption of UCI on PUSCH for a highly dynamic environment, for example if mini-slot transmissions are scheduled late, e.g. after an uplink grant (transmission configuration) has been received, but before transmission on the scheduled transmission resources.

Transmitting acknowledgment information/feedback on the transmission resources may comprise multiplexing acknowledgement information and data/data signaling on the transmission resources, e.g., for UCI on PUSCH scenarios. In general, transmitting acknowledgement information and/or feedback may comprise mapping the information to the transmission resources and/or modulation symbol/s, e.g. based on a modulation and coding scheme and/or transmission format. The acknowledgement information may be punctured or rate-matched. Acknowledgement information pertaining to different subject transmissions and/or acknowledgment signaling processes may be mapped differently. For example, acknowledgement information pertaining to late subject transmissions and/or having a size smaller than a threshold size (e.g., 3 or 2 bits) may be punctured, whereas acknowledgment information pertaining to earlier (non-late) subject transmissions and/or having a size equal to or larger than the threshold size may be rate-matched.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
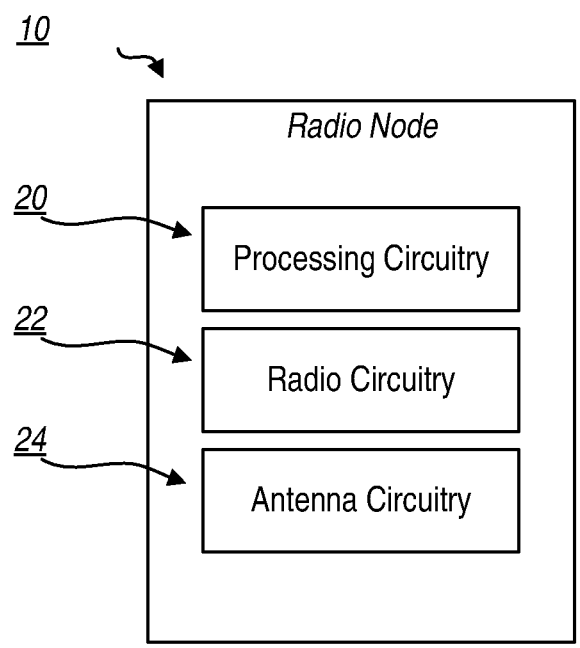
FIG. 1, showing an exemplary radio node implemented as a user equipment.

In the following, approaches are described for illustrative purposes in the context of NR RAT. However, they are generally applicable with other technologies. Also, communication in uplink and downlink between a network node and an UE is described by way of example. The approaches should not be construed to be limited to such communication, but can also be applied for sidelink or backhaul or relay communication. For ease of reference, in some cases it is referred to a channel to represent signaling or transmission on the channel. A PUSCH may represent uplink data signaling, a PDSCH downlink data signaling, a PDCCH downlink control signaling (in particular, one or more DCI messages like scheduling assignments or grants), a PUCCH uplink control signaling, in particular signaling of UCI. In some cases, UCI may be transmitted on PUSCH or associated resource instead of on PUCCH.

Operation of NR requires the transmission of various control information from the UE to the network. Examples of such uplink control information (UCI) are hybrid-ARQ (HARQ) acknowledgements (representing acknowledgement information), channel-state information (CSI), and scheduling request (SR). The UCI can be transmitted on
  a separate control channel, PUCCH, which may occur either at the end of the slot interval or during the slot interval; and/or be
  multiplexed with data and transmitted on PUSCH ("UCI on PUSCH")

Multiplexing of UCI and data can be done in different ways, e.g. by puncturing or rate matching.

In puncturing, the data is encoded (e.g., into modulation symbols) and mapped to the allocated PUSCH resource elements (transmission resources) without considering UCI. In a second step, thus mapped resource elements that should instead carry UCI (respectively their mapped content/symbols) are replaced with UCI modulation symbols. This process is called puncturing. Puncturing will impact the performance of data reception, but as long as the number of data bits that are punctured (and "stolen" for UCI) is reasonable, the data performance degradation is modest. Advantage of puncturing is that a receiver (like gNB, network) does not need to be aware if UCI is inserted or not; even if the network assumes the UE to include UCI but the UE does not, the network can decode PUSCH data anyway. Inconsistency between the UE and network regarding UCI presence can occur due to missed DL scheduling assignments. In such a case, the network expects the UE to transmit an acknowledgement relating to the downlink data transmission, but since the UE did not receive the earlier scheduling assignment, it will not include any HARQ feedback.

A drawback of puncturing is the performance loss it induces on PUSCH data. In puncturing, the coded bits mapped onto resource elements supposed to carry UCI are deleted, irrespective of the importance of the replaced coded bits. Especially for large UCI sizes and high MCS, PUSCH data performance loss can be large. Therefore, puncturing of acknowledgement information like ACK/NACK may be limited to sizes of up to 2 bit, while rate matching may be applied for larger ACK/NACK payload sizes.

Rate matching adjusts the set of coded bits representing the data to "make room" for the UCI. This avoids for example that systematic bits (e.g., information and/or error correction bits)—which are typically more important than parity bits—are not transmitted. Rate matching requires the UE and network to have a coherent understanding of whether UCI is present or not and the size of it, otherwise the network may not be able to decode the uplink data.

As explained above, inconsistency between UE and network regarding UCI presence and size can occur due to missed DL scheduling assignment(s).

DL assignments received after UL grant are discussed. NR provides a lot of flexibility in respect to the time between an DL assignment (an example of a scheduling assignment or assignment, associated to PDCCH), the scheduled PDSCH (data signaling, in particular may represent a subject transmission), and the associated HARQ feedback transmission (acknowledgement feedback). Also, the time from UL grant (an example of a scheduling grant, associated to PDCCH) to PUSCH transmission (which is scheduled with the grant) is flexible. It is therefore possible that a UE receives an UL grant in slot n to transmit PUSCH in slot n+k (k at least=0, but often is 1 or larger). A DL assignment (PDCCH) received in a slot typically schedules a PDSCH in the same slot. Therefore, it is possible to schedule a terminal in DL for slot(s) n+p as long n+p is sufficiently early compared to slot n+m (the time of PUSCH) so that the UE is able to decode the PDSCH received in slot n+p and prepare the HARQ feedback transmission ready in time for slot n+m. Note, it is assumed for simplicity that the time granularity is only slots; NR will also support both data transmissions as well as HARQ feedback transmission on a finer time scale (symbols), but this does not change anything on the fundamental statement: In NR, it is possible to receive PDSCH(s) after an UL grant that schedules PUSCH transmission on transmission resources, which may be used for UCI on PUSCH.

For various reasons, it can be interesting to limit the number of ACK/NACK bits corresponding to late (received after UL grant) PDSCH that needs to be inserted into the HARQ codebook on UCI on PUSCH. The UE might start to do prepare the HARQ codebook as soon as it received the UL grant, any additional bits that need to be included into the HARQ codebook should be kept small. Another reason can be that these extra ACK/NACK bits corresponding to late PDSCH are not packaged (typically packaged would mean encoded) together with ACK/NACK bits corresponding to early PDSCH (early means received the latest at the same time as UL grant) but transmitted in a separate HARQ codebook. This separate HARQ codebook might puncture PUSCH. As explained above, the number of punctured bits should be small to avoid large PUSCH degradations. This is another reason why the number of "late" ACK/NACK bits should be kept small, e.g., to be less or equal to 2.

Code block groups are discussed in the following. A transport block may be segmented into multiple code blocks, if the transport block exceeds a certain size. For error detection, each code block as well as the transport block may have its own CRC (or generally, other error detection coding). The HARQ feedback may be based on the decoding status of the transport block, such that a single HARQ feedback bit is generated per transport block, which does not allow identification of which substructures (code blocks) contain an error.

NR supports this operation mode. In addition, NR also supports code block group (CBG) HARQ feedback. Herein, one or multiple code blocks are grouped into a CBG, and one HARQ feedback bit is generated for each CBG. This is useful, since only a fraction of the transport blocks needs to be retransmitted if only one or few CBG are in error.'

CBG-based feedback can be particular useful for very large transport blocks, where a re-transmission of the complete transport block would lead to large overhead if only one or few code blocks are in error. With CBG-based feedback, only the code block groups in error can be retransmitted. Another application of CBG-based feedback is preemption, where an ongoing transmission is interrupted in favor of a low latency transmission. If the preempting transmission is only of short duration just a few code blocks might be destroyed, favoring again a selective transmission of individual code blocks.

Generally, acknowledgement information for subject transmission, e.g. on PDSCH, received or scheduled after the UL grant may be considered, wherein the acknowledgement information may require multi-bit feedback (e.g., due to CBG configuration, or a MIMO transmission with two or more transport blocks), which in particular can exceed 2 (or another one-digit number) bit. The UE may assume a different (smaller size) HARQ reporting configuration for ACK/NACK bits corresponding to PDSCH(s) and/or associated scheduling assignments received after an UL grant than for PDSCH/assignments received before the UL grant.

HARQ feedback can be provided for late PDSCH or alternatively, PDSCH requiring multiple bit HARQ feedback can be scheduled after the UL grant allowing for UCI on PUSCH has been transmitted.

Some scenarios in which in which a UE needs to feedback multiple ACK/NACK bits corresponding to a PDSCH (subject transmission) can be
1. The PDSCH is associated with a CBG configuration requiring at least 2 bit HARQ feedback bit
2. The PDSCH is scheduled/configured using a MIMO configuration requiring at least 2 bit HARQ feedback bit
3. The UE receives multiple PDSCH, e.g. in time or component carrier dimension If any of above applies to PDSCH or an associated assignment received after an UL grant used for UCI on PUSCH, the number of ACK/NACK bits can easily exceed 2 (few) bit.

PDSCH received (or scheduled for reception) after an UL grant could pertain to different slots or timings. For example, it could pertain to the immediate next slot after the UL-grant-slot, but it could also refer to a time slot k0 slots (k0 may be 0 or larger, and/or potentially b0 symbols if one considers mini-slots, with b0 1 or larger if k0=0) after the UL-grant-slot/symbol. A fast UE might not have a problem with a PDSCH received in the immediate slot after it received the UL grant, but it requires special procedures for a PDSCH received in the next-next slot. For some applications, the PDSCH may be in a mini-slot, and the associated feedback may be configured for a mini-slot as well.

In one example, the UE received the UL grant in slot n, and should transmit PUSCH in slot n+4. In this case, a PDSCH received in slot n+1 is still OK and is reported together with earlier PDSCH, while a PDSCH received in slot n+2 may be too late and is thus reported separately. For example, depending on UE processing time "after" does not necessarily mean immediate next slot but could also refer to a later slot. In 3GPP, it can be envisioned that there will be only one possibility or that—depending on UE capability—it can be configured what "after" means.

In most parts of the text the PDSCH timing relative to the UL grant (PDCCH for UL grant) timing is considered to be the determining factor how to handle the HARQ feedback (i.e. how much later PDSCH comes after UL grant). Another possibility is to consider the timing between DL assignment (PDCCH for DL assignment) and UL grant (PDCCH for UL grant) as the determining factor (if DL assignment is transmitted in the same slot as PDSCH—a typical case—this is the same as the previous case).

Another possibility for the determining factor could be the timing between PDSCH and the time of PUSCH (and not the UL grant). Yet another possibility for the determining factor could be the time from DL assignment (PDCCH for DL assignment) to PUSCH, or between DL assignment to UL grant. In case the determining factor depends on PDSCH, it can be considered to base the determining factor on the time between UL-grant and PDSCH-end and UL-grant or PDSCH-end and PUSCH. To differentiate between PDSCH start and end is especially needed for a multi-slot PDSCH.

The expression "late PDSCH" is used to refer to any of above determining factors.

An exemplary scenario considering a CBG configuration is considered. A UE may receive a late PDSCH for which it should report HARQ feedback according to a CBG configuration. For late PDSCH, the UE falls back to another—smaller—CBG configuration or even transport block based feedback. In case of a smaller CBG configuration the UE needs to be configured with a first CBG configuration it normally uses and a second CBG configuration it uses for ACK/NACK bits corresponding to late PDSCH. In case the fallback solution is transport block based feedback, no explicit second CBG configuration is needed. Transport block based feedback can be seen as very simple CBG-based feedback.

An exemplary scenario with a MIMO configuration is described, which may be independent of combined with the above CBG approach. A UE may receive late PDSCH with MIMO, requiring more than 1 HARQ feedback bit (e.g., two or more transport blocks). Even if a UE/terminal is not configured to apply bundling in spatial domain to "regular" PDSCH, the UE could apply bundling to ACK/NACK bits corresponding to late PDSCH. In most cases, a PDSCH with MIMO requires ACK/NACK feedback of 1 or 2 bit; in this case 2 bit would be AND-reduced to a single bit (e.g., ACK if both transport blocks are correctly received, NACK if not). In case of more than 2 bit, bundling could be done applying AND across all bits, or only partial bundling may be applied, reducing the feedback size but not all the way down to 1 bit. In this case, each of several transport blocks for which at least one bit is configured for acknowledgement information by a feedback configuration may be considered as data substructure, and a combination of two or more transport blocks may be considered a data structure. It should be noted that lower-level substructures like CBGs or CBs may be considered as well.

An exemplary scenario with multiple received DL assignments is discussed. If a terminal receives multiple late PDSCH, either in time-domain or across multiple component carriers, the UE can apply temporal (time-domain) bundling and/or bundling across component carriers. Preferable, the UE starts with bundling in the time (temporal) domain since correlation between ACK/NACK bits in this dimension is higher than in component carrier dimension. So, preferable the UE starts with bundling in temporal domain followed (only if needed) by bundling across component carrier. As in the MIMO case, bundling can imply reducing the feedback size down to a single bit or only partial bundling, in time and/or component carrier dimension. The different DL assignments, respectively the associated PDSCHs may pertain to different transport blocks, as discussed above.

Bundling rules and combinations are discussed. Above rules can be combined either all or partly. For example, if a UE received a late PDSCH with both MIMO and CBG configuration, or multiple late PDSCH with MIMO and/or CBG configuration. One possible order how to apply the rules would be 1) bundling across CBG 2) bundling across MIMO 3) bundling across time 4) bundling across component carriers. Another example would exchange 1 and 2 above. Bundling may generally refer to combining two or more data substructures for each of which one or more bits of acknowledgement information is configured by a feedback configuration such that acknowledgement information (in particular, one bit) is transmitted that pertains to the combination (represented by the data structure associated to the combination), replacing the configured acknowledgement information.

The reduced HARQ feedback for late PDSCH may inserted into PUSCH for example by puncturing or rate matching.

Generally, there are described scenarios in which HARQ feedback for PDSCH received after an UL grant for UCI on PUSCH is treated differently than HARQ feedback for PDSCH received before the UL grant. One example of different treatment is that a potential CBG configuration is not applied, but transport block based feedback is used instead.

Mini-slots or non-slot-based transmissions may be considered. NR supports slot-based transmission, where a DL assignment (or scheduling assignment, typically contained in a DCI transmitted on PDCCH) may be received at the beginning of a slot. The scheduled DL transmission (e.g., PDSCH) typically may also start early in the slot.

In addition, NR also supports non-slot-based transmissions or mini-slots. Here, the scheduled DL transmission (e.g., PDSCH) can in principle start at any symbol, also the transmission duration is flexible and usually (significantly) shorter than a slot duration. The scheduling PDCCH might be either located at the beginning of the slot or at the beginning of the actual DL transmission, or in a suitable CORESET. The latter is especially useful for low latency transmission, where the determination that a transmission needs to be scheduled happens late and slot-based scheduling is no longer possible. Mini-slots are therefore especially useful for above mentioned low latency transmissions which might interrupt (preempt) an already ongoing transmission.

In NR terminology, a slot-based transmission is also denoted as PDSCH scheduling Type A, while non-slot-based transmission (mini-slot) is denoted PDSCH transmission Type B.

Exemplary DL control signaling is discussed in more detail. DL assignments and UL grants may be contained in Downlink Control Information (DCI) messages that are typically sent on the PDCCH. The resources a UE searches for a PDCCH candidate are typically organized in a control resource set (CORESET). Within a CORESET a UE might have one or more search spaces configured. A search space is an arrangement of physical resources within the CORESET which the UE needs to search for PDCCH candidates and the contained DCI. Typically, PDCCH candidates and/or DCIs of different sizes are organized in different search spaces. A UE needs to determine if a detected PDCCH candidate is for the UE. This could for example be done by including a UE identifier (e.g. RNTI) into the DCI, or scrambling the CRC of the encoded DCI with the UE identity (e.g. RNTI). For Polar codes, which may be used to encode DCI, UE identify (e.g. RNTI) can also be put on frozen bits, a particularity of Polar codes.

A carrier may be portioned into bandwidth parts (BWP). Bandwidth parts can have multiple usages. One of the envisioned usage scenarios is to enable multiple numerologies mixed in frequency-domain on the same carrier. A BWP configuration may indicate a set of frequency-domain resources, and an associate numerology. A UE can be configured with one or multiple BWP parts. DL and UL configurations (and/or SL configurations) may be are independent from each other. Typically, each BWP has its own associated CORESET for the scheduling DCI.

The DCI (scheduling assignment) could contain a bit field that determines the time-domain resources of the scheduled transmission, e.g. start symbol and/or slot and end symbol and/or slot. This bit field could also be used to determine the CBG configuration used in the HARQ feedback. The DCI field determining the time-domain resources can also—e.g., instead of, or in addition to, explicitly indicating a start and stop position—select one out of a set of configured time-domain resource allocations.

An example for an explicit indication would be to include in a DCI an explicit bit or bit field that selects the CBG configuration for HARQ feedback out of a set of CBG configurations configured, e.g. for the carrier.

Note that transport block based feedback is also considered as (a very simple) CBG configuration.

FIG. 1 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 2:
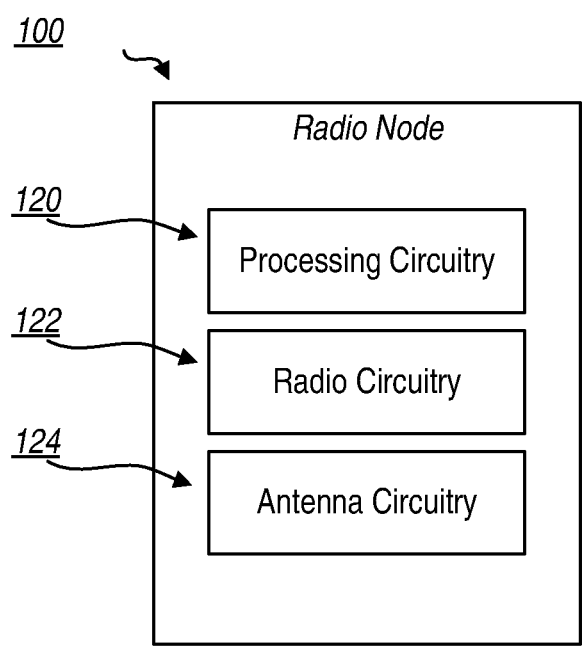
FIG. 2, showing an exemplary radio node implemented as a network node.

FIG. 2 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more sy and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A resource pool generally may indicate and/or comprise resources, in particular time-frequency resources, e.g. time and frequency intervals, which may be contiguous or interrupted, and/or code resources. A resource pool may in particular indicate and/or comprise resource elements and/or resource blocks, e.g. PRBs. A radio node like a user equipment may be considered to be configured with a resource pool if it received corresponding control signaling configuring it therewith. Such control signaling may in particular be transmitted by a receiving radio node as described herein. The control signaling may in particular be higher layer signaling, e.g. MAC and/or RRC signaling, and/or may be semi-static or semi-persistent. In some cases, the responding radio node or user equipment may be considered configured with a resource pool, if it is informed about a corresponding configuration, e.g. that it may access resources in the pool for transmitting. Such a configuration in some cases may be predefined, e.g. based on a standard and/or default configuration. A resource pool may be dedicated to one responding radio node or user equipment, or in some cases shared between several. It may be considered that a resource pool may be general, or for specific types of signaling, e.g. control signaling or data signaling. A transmission resource pool may in particular be for control signaling, e.g. uplink control signaling and/or sidelink control signaling, and/or may be dedicated to the user equipment/responding radio node. It may be considered that a resource pool comprises a plurality of resource structures, which may be arranged in subpools or groups, e.g. pertaining and/or according to type of (received or scheduled) signaling or type of response control signaling. Each group or subpool may comprise a number of resource structures, wherein the number may be representable by an indicator and/or bit field of the selection control information. For example, the maximum number of resource structures in a group may correspond to the maximum number of different values representable by the bit field or indicator. Different groups may have different numbers of resource structures. It may generally be considered that a group comprises a smaller number of resource structures than representable by the indicator or bit field. A resource pool may represent a search space and/or space of availability of resources and/or resource structures available for specific signaling. In particular, a transmission resource pool may be considered to represent a (time/frequency and/or code) domain or space of resources available for response control signaling.

A signaling characteristic may represent resources and/or resource structures in a reception resource pool, which may be different from the transmission resource pool. Resources and/or resource structures representing signaling characteristics of characterising signaling, in particular downlink (or sidelink) control signaling, and/or a corresponding pool, may in particular comprise one or more CORESETs (COntrol REsource SETs), each of which may represent a group or subpool. A CORESET may be associated to a specific time interval, in particular in a transmission timing structure like a slot, e.g. one or more symbols. It may be considered that a first CORESET is configured for the 1, 2, or 3 first symbols in a slot. A second CORESET may be configured for one or more later symbols, e.g. the 5th and/or 6th symbol of the same slot. In this case, the second CORESET may in particular correspond to mini-slot related signaling, e.g. comprise resource structures associated to short (e.g., 1 or 2 symbols) response control signaling, and/or a short latency requirement (e.g., 1 or 2 symbols), and/or received or scheduled transmission in a mini-slot and/or in response to a mini-slot, e.g. mini-slot data signaling. The first CORESET may be associated to slot-based signaling, e.g. long data signaling (e.g., longer than 2, 3 or 4 symbols), and/or response control signaling with relaxed latency requirement (e.g., more than 1 or 2 symbols, and/or allowing transmission in a later transmission timing structure like a later slot or subframe), and/or long response control signaling, e.g. longer than 2 or 3 or 4 symbols. Generally, different CORESETs may be separated in time domain by at least 1 symbol, in particular by 1, 2, 3 or 4 symbols. Depending in which of the groups or subpools, in particular CORESETs, characterising signaling is received, it may be associated to a specific subpool or group of the transmission resource pool. A reception resource pool may be predefined and/or configured to the responding radio node, e.g. by the receiving radio node, which may alternatively or additionally configure the transmission resource pool. Pool configuration may generally be predefined, or performed by the network or a network node (e.g., a receiving radio node), or another responding radio node taking the corresponding functionality and/or also operating as a receiving radio node, e.g. in sidelink communication (in which the configuration may be performed by another UE, or the network/network node).

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement or substructure of a data element or data block like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping.

Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

Operational conditions may pertain to load of the RAN, or application or use case of transmission or signaling, and/or quality of service (QoS) conditions (or requirements) for a transmission or signaling. QoS may for example pertain to data rate and/or priority and/or latency and/or transmission quality, e.g. BLER or BER. Use for URLLC may be considered a quality of service-related condition.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK/NACK Acknowledgment/Negative Acknowledgement
ARQ Automatic Repeat reQuest
CAZAC Constant Amplitude Zero Cross Correlation
CBG Code Block Group
CDM Code Division Multiplex
CM Cubic Metric
CORESET Control channel Resource Set
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DM(-)RS Demodulation reference signal(ing)
FDM Frequency Division Multiplex
HARQ Hybrid Automatic Repeat Request
IFFT Inverse Fast Fourier Transform
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
QoS Quality of Service
RB Resource Block
RNTI Radio Network Temporary Identifier
RRC Radio Resource Control
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
TDM Time Division Multiplex
UCI Uplink Control Information
UE User Equipment
URLLC Ultra Low Latency High Reliability Communication
VL-MIMO Very-large multiple-input-multiple-output
ZF Zero Forcing Abbreviations may be considered to follow 3GPP usage if applicable.

The invention claimed is:

1. A method of operating a feedback radio node in a radio access network, the method comprising:
receiving a scheduling grant;
configuring a feedback configuration, the feedback configuration configuring the feedback radio node to provide acknowledgement feedback pertaining to a subject transmission scheduled for reception by the feedback radio node, the feedback configuration configuring, for the acknowledgement feedback, a plurality of data substructures associated to the subject transmission such that the feedback configuration configures the acknowledgement feedback according to one of:
a first coding block group (CBG) configuration including at least one bit of acknowledgement information for each of the plurality of data substructures; and
a second CBG configuration including at least one bit of acknowledgement information for a data structure comprising at least two of the plurality of data substructures;
receiving the subject transmission;
configuring a transmission configuration, the transmission configuration configuring a plurality of transmission resources for transmission by the feedback radio node, the transmission configuration being configured utilizing the scheduling grant; and
causing transmission, on the plurality of transmission resources, of the acknowledgement feedback pertaining to the subject transmission, the acknowledgement feedback being configured according to one of:
the first CBG configuration based on the subject transmission being received prior to the receipt of the scheduling grant; and
the second CBG configuration based on the subject transmission being received after the receipt of the scheduling grant.

2. The method according to claim 1, wherein the transmission configuration pertains to transmitting on a physical shared channel.

3. The method according to claim 1, wherein the feedback configuration pertains to transmitting on a physical control channel.

4. The method according to claim 1, wherein the acknowledgement information configured by the feedback configuration has a size of N bits, wherein the acknowledgement information transmitted on the plurality of transmission resources has a size of M bits.

5. The method according to claim 1, wherein the data structure is a transport block, and the data substructures are code block groups.

6. The method according to claim 1, wherein the subject transmission is a MIMO transmission utilising at least one of:
at least two MIMO-layers; and
at least two data streams.

7. The method according to claim 1, wherein a data substructure comprises one or more code blocks.

8. The method according to claim 1, wherein the bits of the acknowledgement information are punctured onto the plurality of transmission resources.

9. The method according to claim 1, wherein the subject transmission is a transmission on a physical data channel.

10. The method according to claim 1, wherein at least one of:
the feedback configuration is configured utilising a scheduling assignment; and
the feedback configuration is configured after the transmission configuration.

11. A method of operating a configuring radio node in a radio access network, the method comprising:
configuring a feedback radio node with a feedback configuration, the feedback configuration configuring the feedback radio node to provide acknowledgement feedback for a subject transmission scheduled for reception by the feedback radio node, the feedback configuration configures, for the acknowledgement feedback, a plurality of data substructures associated to the subject transmission such that the feedback configuration configures the acknowledgement feedback according to one of:
a first coding block group (CBG) configuration including at least one bit of acknowledgement information for each of the plurality of data substructures;
a second CBG configuration including at least one bit of acknowledgement information for a data structure comprising at least two of the plurality of data substructures;
configuring the feedback radio node with a transmission configuration, the transmission configuration configuring a plurality of transmission resources for transmission by the feedback radio node, the transmission configuration being configured utilizing a scheduling grant; and
receiving the acknowledgement feedback transmitted on the plurality of transmission resources, the acknowledgement feedback pertaining to the subject transmission, the acknowledgement feedback being configured according to one of:
the first CBG configuration based on the subject transmission being received prior to the receipt of the scheduling grant; and
the second CBG configuration based on the subject transmission being received after the receipt of the scheduling grant.

12. The method according to claim 11, wherein the transmission configuration pertains to transmitting on a physical shared channel.

13. The method according to claim 11, wherein the feedback configuration pertains to transmitting on a physical control channel.

14. The method according to claim 11, wherein the acknowledgement information configured by the feedback configuration has a size of N bits, wherein the acknowledgement information transmitted on the plurality of transmission resources has a size of M bits.

15. The method according to claim 11, wherein the data structure is a transport block, and the data substructures are code block groups.

16. The method according to claim 11, wherein the subject transmission is a MIMO transmission utilising at least one of:
at least two MIMO-layers; and
at least two data streams.

17. The method according to claim 11, wherein a data substructure comprises one or more code blocks.

18. A feedback radio node for a radio access network, the feedback radio node including processing circuitry, the processing circuitry being configured to:
receive a scheduling grant;
configure a feedback configuration, the feedback configuration configuring the feedback radio node to provide acknowledgement feedback pertaining to a subject transmission scheduled for reception by the feedback radio node, the feedback configuration configuring, for the acknowledgement feedback, a plurality of data substructures associated to the subject transmission such that the feedback configuration configures the acknowledgement feedback according to one of:
a first coding block group (CBG) configuration including at least one bit of acknowledgement information for each of the plurality of data substructures; and
a second CBG configuration including at least one bit of acknowledgement information for a data structure comprising at least two of the plurality of data substructures;
receive the subject transmission;
configure a transmission configuration, the transmission configuration configuring a plurality of transmission resources for transmission by the feedback radio node, the transmission configuration being configured utilizing the scheduling grant; and
cause transmission, on the plurality of transmission resources, of the acknowledgement feedback pertaining to the subject transmission, the acknowledgement feedback being configured according to one of:
the first CBG configuration based on the subject transmission being received prior to the receipt of the scheduling grant; and
the second CBG configuration based on the subject transmission being received after the receipt of the scheduling grant.

19. A configuring radio node for a radio access network, the configuring radio node including processing circuitry, the processing circuitry being configured to:
configure a feedback radio node with a feedback configuration, the feedback configuration configuring the feedback radio node to provide acknowledgement feedback for a subject transmission scheduled for reception by the feedback radio node, the feedback configuration configures, for the acknowledgement feedback, a plurality of data substructures associated to the subject transmission such that the feedback configuration configures the acknowledgement feedback according to one of:
a first coding block group (CBG) configuration including at least one bit of acknowledgement information for each of the plurality of data substructures;
a second CBG configuration including at least one bit of acknowledgement information for a data structure comprising at least two of the plurality of data substructures;
configure the feedback radio node with a transmission configuration, the transmission configuration configuring a plurality of transmission resources for transmission by the feedback radio node, the transmission configuration being configured utilizing a scheduling grant; and
receive the acknowledgement feedback transmitted on the plurality of transmission resources, the acknowledgement feedback pertaining to the subject transmission, the acknowledgement feedback being configured according to one of:
the first CBG configuration based on the subject transmission being received prior to the receipt of the scheduling grant; and the second CBG configuration based on the subject transmission being received after the receipt of the scheduling grant.

20. A non-transitory computer storage medium storing a computer program comprising instructions that, when executed, cause processing circuitry to at least one of control and perform a method of operating a feedback radio node in a radio access network, the method comprising:
   receiving a scheduling grant;
   configuring a feedback configuration, the feedback configuration configuring the feedback radio node to provide acknowledgement feedback pertaining to a subject transmission scheduled for reception by the feedback radio node, the feedback configuration configuring, for the acknowledgement feedback, a plurality of data substructures associated to the subject transmission such that the feedback configuration configures the acknowledgement feedback according to one of:
      a first coding block group (CBG) configuration including at least one bit of acknowledgement information for each of the plurality of data substructures; and
      a second CBG configuration including at least one bit of acknowledgement information for a data structure comprising at least two of the plurality of data substructures;
   receiving the subject transmission;
   configuring a transmission configuration, the transmission configuration configuring a plurality of transmission resources for transmission by the feedback radio node, the transmission configuration being configured utilizing the scheduling grant; and
   causing transmission, on the plurality of transmission resources, of the acknowledgement feedback pertaining to the subject transmission, the acknowledgement feedback being configured according to one of:
      the first CBG configuration based on the subject transmission being received prior to the receipt of the scheduling grant; and
      the second CBG configuration based on the subject transmission being received after the receipt of the scheduling grant.

* * * * *